United States Patent
Fujimoto (10) Patent No.: US 8,270,349 B2
(45) Date of Patent: Sep. 18, 2012

(54) WIRELESS COMMUNICATION SYSTEM, BASE STATION, MANAGEMENT SERVER, AND WIRELESS COMMUNICATION METHOD

(75) Inventor: Shinobu Fujimoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 514 days.

(21) Appl. No.: 12/492,083

(22) Filed: Jun. 25, 2009

(65) Prior Publication Data
US 2009/0323590 A1 Dec. 31, 2009

(30) Foreign Application Priority Data

Jun. 25, 2008 (JP) ................................. 2008-166157

(51) Int. Cl.
*H04W 4/00* (2009.01)
(52) U.S. Cl. ....................................... 370/328; 370/400
(58) Field of Classification Search .......... 370/328–329, 370/335–336, 338, 342–343, 345, 389, 392, 370/400–401, 498, 503, 508, 516
See application file for complete search history.

(56) References Cited

U.S. PATENT DOCUMENTS

| | | | |
|---|---|---|---|
| 6,526,035 B1 * | 2/2003 | Atarius et al. ................ | 370/342 |
| 6,553,230 B1 * | 4/2003 | Plestid et al. ................ | 455/436 |
| 6,751,206 B1 | 6/2004 | Padovani et al. | |
| 6,850,501 B1 * | 2/2005 | Sebire .......................... | 370/329 |
| 7,110,781 B1 | 9/2006 | Hulbert et al. | |
| 7,680,075 B2 * | 3/2010 | Ma et al. ...................... | 370/328 |
| 8,126,462 B2 * | 2/2012 | Thakare ........................ | 455/436 |
| 2004/0136336 A1 * | 7/2004 | Nakamura et al. ............ | 370/328 |
| 2005/0037763 A1 | 2/2005 | Hamamoto et al. | |
| 2007/0053280 A1 * | 3/2007 | Uesugi .......................... | 370/208 |
| 2010/0061305 A1 * | 3/2010 | Kubo ............................ | 370/328 |

FOREIGN PATENT DOCUMENTS

| | | |
|---|---|---|
| JP | 2003-507957 | 2/2003 |
| JP | 2003-531552 | 10/2003 |
| JP | 2004-508744 | 3/2004 |
| JP | 2005-027189 | 1/2005 |
| JP | 2007-174357 | 7/2007 |

OTHER PUBLICATIONS

Office Action from Japanese Patent Application No. 2008-166157, dated Jun. 11, 2010, 5 pages.

* cited by examiner

*Primary Examiner* — Chi H. Pham
*Assistant Examiner* — Kevin Mew
(74) *Attorney, Agent, or Firm* — Richard C. Kim; Duane Morris, LLP (57) ABSTRACT

A wireless communication system includes a plurality of base stations and a management server. Each base station includes: a carrier sensing unit which performs carrier sensing for other base stations; a list generating unit which generates a monitor list including a difference in frame timing between the base station and each other base station; and a base station transmitter which transmits the monitor list. The management server includes: a management receiver which receives the monitor lists; a calculation unit which calculates a shift amount by which the frame timing of a target base station is to be shifted, based on the monitor lists; and a shift instructing unit which instructs to shift the frame timing of the target base station by the shift amount if the differences in frame timing among the base stations when reflecting the shift amount is improved from those before reflecting the shift amount.

17 Claims, 9 Drawing Sheets

| RECEIVING BASE STATION | DIFFERENCE FROM REGULAR TIMING [μsec] |
|---|---|
| 120A | 1.80 |
| 120B | 1.10 |
| 120C | −1.00 |
| 120D | −1.20 |
| 120E | 0.50 |

FIG. 6B

RELATIVE DISTANCE [m]

| T \ R | 120A | 120B | 120C | 120D | 120E |
|---|---|---|---|---|---|
| 120A |  | 310 | 300 | 410 | 3010 |
| 120B | 310 |  | 60 | 140 | 3058 |
| 120C | 300 | 60 |  | 120 | 3000 |
| 120D | 410 | 140 | 120 |  | 3000 |
| 120E | 3010 | 3058 | 3000 | 3000 |  |

T = TRANSMISSION
R = RECEPTION

| TRANSMITTING BASE STATION | RELATIVE DELAY QUANTITY [μsec] |
|---|---|
| – | – |
| 120B | −1.73 |
| 120C | −3.80 |
| 120D | −4.37 |
| 120E | −11.34 |

120B

| TRANSMITTING BASE STATION | RELATIVE DELAY QUANTITY [μsec] |
|---|---|
| 120A | −0.33 |
| – | – |
| 120C | −2.30 |
| 120D | −2.77 |
| 120E | −10.80 |

120C

| TRANSMITTING BASE STATION | RELATIVE DELAY QUANTITY [μsec] |
|---|---|
| 120A | 1.80 |
| 120B | 1.90 |
| – | – |
| 120D | −0.60 |
| 120E | −8.51 |

120D

| TRANSMITTING BASE STATION | RELATIVE DELAY QUANTITY [μsec] |
|---|---|
| 120A | 1.63 |
| 120B | 1.83 |
| 120C | −0.20 |
| – | – |
| 120E | −8.31 |

120E

| TRANSMITTING BASE STATION | RELATIVE DELAY QUANTITY [μsec] |
|---|---|
| 120A | −8.74 |
| 120B | −9.60 |
| 120C | −11.51 |
| 120D | −11.71 |
| – | – |

FIG. 7A

| DIFFERENCE IN FRAME TIMING [μsec] | | | | | |
|---|---|---|---|---|---|
| T \ R | 120A | 120B | 120C | 120D | 120E |
| 120A |  | −0.33 | 1.80 | 1.63 | −8.74 |
| 120B | −1.73 |  | 1.90 | 1.83 | −9.60 |
| 120C | −3.80 | −2.30 |  | −0.20 | −11.51 |
| 120D | −4.37 | −2.77 | −0.60 |  | −11.71 |
| 120E | −11.34 | −10.80 | −8.51 | −8.31 |  |

T = TRANSMISSION
R = RECEPTION

FIG. 7B

| TRANSMITTING BASE STATION | AVERAGE [μsec] |
|---|---|
| 120A | −1.41 |
| 120B | −1.90 |
| 120C | −4.45 |
| 120D | −4.86 |
| 120E | −9.74 |

FIG. 7C

| TRANSMITTING BASE STATION | VARIANCE [μsec] |
|---|---|
| 120A | 4.31 |
| 120B | 4.68 |
| 120C | 4.27 |
| 120D | 4.17 |
| 120E | 1.35 |

FIG. 7D

| DIFFERENCE IN FRAME TIMING [μsec] | | | | | |
|---|---|---|---|---|---|
| T \ R | 120A | 120B | 120C | 120D | 120E |
| 120A |  | −0.33 | 1.80 | 1.63 | −18.48 |
| 120B | −1.73 |  | 1.90 | 1.83 | −19.34 |
| 120C | −3.80 | −2.30 |  | −0.20 | −21.25 |
| 120D | −4.37 | −2.77 | −0.60 |  | −21.45 |
| 120E | −1.60 | −1.10 | 1.23 | 1.43 |  |

T = TRANSMISSION
R = RECEPTION

FIG. 8A

| RECEIVING BASE STATION | DIFFERENCE FROM REGULAR TIMING [μsec] |
|---|---|
| 120A | 10.00 |
| 120B | 1.10 |
| 120C | −1.00 |
| 120D | −1.20 |
| 120E | 0.50 |

FIG. 8B

| RELATIVE DISTANCE [m] | | | | | |
|---|---|---|---|---|---|
| T \ R | 120A | 120B | 120C | 120D | 120E |
| 120A |  | 310 | 300 | 410 | 305 |
| 120B | 310 |  | 60 | 140 | 360 |
| 120C | 300 | 60 |  | 120 | 300 |
| 120D | 410 | 140 | 120 |  | 310 |
| 120E | 305 | 360 | 300 | 310 |  |

T = TRANSMISSION
R = RECEPTION

| TRANSMITTING BASE STATION | RELATIVE DELAY QUANTITY [μsec] |
|---|---|
| − | − |
| 120B | −9.93 |
| 120C | −12.00 |
| 120D | −12.57 |
| 120E | −10.52 |

120B

| TRANSMITTING BASE STATION | RELATIVE DELAY QUANTITY [μsec] |
|---|---|
| 120A | 7.87 |
| − | − |
| 120C | −2.30 |
| 120D | −2.77 |
| 120E | −1.80 |

120C

| TRANSMITTING BASE STATION | RELATIVE DELAY QUANTITY [μsec] |
|---|---|
| 120A | 10.00 |
| 120B | 1.90 |
| − | − |
| 120D | −0.60 |
| 120E | 0.50 |

120D

| TRANSMITTING BASE STATION | RELATIVE DELAY QUANTITY [μsec] |
|---|---|
| 120A | 9.83 |
| 120B | 1.83 |
| 120C | −0.20 |
| − | − |
| 120E | 0.67 |

120E

| TRANSMITTING BASE STATION | RELATIVE DELAY QUANTITY [μsec] |
|---|---|
| 120A | 8.48 |
| 120B | −0.60 |
| 120C | −2.50 |
| 120D | −2.73 |
| − | − |

FIG. 9A

| DIFFERENCE IN FRAME TIMING [μsec] | | | | | |
|---|---|---|---|---|---|
| T \ R | 120A | 120B | 120C | 120D | 120E |
| 120A |  | 7.87 | 10.00 | 9.83 | 8.48 |
| 120B | -9.93 |  | 1.90 | 1.83 | -0.60 |
| 120C | -12.00 | -2.30 |  | -0.20 | -2.50 |
| 120D | -12.57 | -2.77 | -0.60 |  | -2.73 |
| 120E | -10.52 | -1.80 | 0.50 | 0.67 |  |

T = TRANSMISSION
R = RECEPTION

FIG. 9B

| TRANSMITTING BASE STATION | AVERAGE [μsec] |
|---|---|
| 120A | 9.05 |
| 120B | -1.70 |
| 120C | -4.25 |
| 120D | -4.67 |
| 120E | -2.79 |

FIG. 9C

| TRANSMITTING BASE STATION | VARIANCE [μsec] |
|---|---|
| 120A | 0.90 |
| 120B | 4.86 |
| 120C | 4.56 |
| 120D | 4.65 |
| 120E | 4.57 |

FIG. 9D

| DIFFERENCE IN FRAME TIMING [μsec] | | | | | |
|---|---|---|---|---|---|
| T \ R | 120A | 120B | 120C | 120D | 120E |
| 120A |  | -1.18 | 0.95 | 0.78 | -0.57 |
| 120B | -0.88 |  | 1.90 | 1.83 | -0.60 |
| 120C | -2.95 | -2.30 |  | -0.20 | -2.50 |
| 120D | -3.52 | -2.77 | -0.60 |  | -2.73 |
| 120E | -1.47 | -1.80 | 0.50 | 0.67 |  |

T = TRANSMISSION
R = RECEPTION

WIRELESS COMMUNICATION SYSTEM, BASE STATION, MANAGEMENT SERVER, AND WIRELESS COMMUNICATION METHOD

CROSS-REFERENCE TO RELATED APPLICATION

This application claims priority from Japanese Patent Application No. 2008-166157, filed on Jun. 25, 2008, the entire subject matter of which is incorporated herein by reference.

BACKGROUND OF THE INVENTION

1. Field of the Invention

The present invention relates to a wireless communication system which adjusts frame timing between base stations, a base station and a management server used in the wireless communication system, and a wireless communication method.

2. Description of the Related Art

A wireless communication system such as a Personal Handy-phone System (PHS) or mobile phones employs a TDMA/TDD scheme which, while using Time Division Duplex (TDD) of dividing a communication path with respect to a time axis and alternately transmitting and receiving data through the divided communication paths to realize a concurrent bidirectional communication, uses a Time Division Multiple Access (TDMA) scheme of dividing the transmitting and receiving times (frames) into a plurality of time slots. It is considered that an Association of Radio Industries and Business (ARIB) STD T95 or PHS Memorandum of Understanding (MoU) is employed as a next-generation PHS communication standard enabling a high-speed digital communication.

In the communication standard such as the ARIB STD T95 or the PHS MoU, an Orthogonal Frequency Division Multiplexing (ODFM) scheme is employed. The OFDM scheme is one of multiplexing schemes effectively using a plurality of carrier waves in a unit time axis by allowing the frequency bands of the carrier waves to partially overlap with each other so that signal waves to be modulated are orthogonal in phase between the neighboring carrier waves. An Orthogonal Frequency Division Multiplex Access (OFDMA) is also provided in which a plurality of users share all subchannels and a subchannel having the best transmission efficiency is assigned to the corresponding user while subchannels are assigned to individual users in a time division manner in the OFDM scheme.

In any of the above-mentioned communication schemes, a mobile station sets up a communication link with a base station through a channel or subchannel assigned to a base station. Accordingly, the mobile station has to be synchronous with frame timing (transmitting and receiving times) of data in the base station. The base station broadcasts a control signal (control signal transmission channel (CCH: Control Channel)), for example, every 20 frame timings (5 millisecond), that is, every 100 millisecond, and the mobile station receives the control signal and sets up a wireless communication in synchronization with the control signal.

The frame timing synchronization (frame synchronization) has to be made between base stations, as well as between a mobile station and a base station. In a wireless communication system, a plurality of base stations wirelessly communicate with a plurality of mobile stations using the same wireless frequency bands. Accordingly, when the base stations set up wireless communications with the mobile stations at frame timings independent from each other, electric wave interference or fading may occur.

It is considered that a handover of changing a communicating base station of a mobile station is carried out due to a change in electric wave between the mobile station and the base station. When the frame timings of the base stations are different from each other, radio signals cannot be effectively acquired so disable a smooth handover. Therefore, the frame synchronization between the base stations has to be carried out so that the plurality of base stations have the same frame timing before carrying out the synchronization between the mobile station and the base station. The frame synchronization is carried out to be synchronous with the absolute time acquired by a Global Positioning System (GPS) in a master base station, and is carried out in a slave station to be synchronous with a control signal of the master base station or another slave base station. When the frame synchronization is carried out in this way, it is possible to avoid interference with different slots in neighboring base stations.

When different base stations use the same frequency band in the same slot, a problem in the similar interference may occur. As described in JP-A-2005-027189 or US2005/0037763, this problem can be avoided using a technique of grouping a plurality of cells into the number of groups smaller than the number of cells constituting a closed cluster and assigning frequency bands to the groups. Additionally, JP-A-2004-508744 or U.S. Pat. No. 6,751,206 describes a technique to reduce interference due to transmission to a mobile station in a sector of a cell and its neighboring cells, by using a beam switching technique.

Interference can be theoretically avoided by the above-described frame synchronization or the assignment of proper frequency bands in the same slot. However, it may be actually influenced by electric waves from a base station apart by an assumed distance or more. In this case, even when the frame timings are completely synchronized in the absolute time, a propagation delay occurs due to the distance. When the propagation delay exceeds a guard interval (GI) provided for compensating the electric wave interference or fading, inter-symbol interference may be caused.

In base stations apart from each other, a control signal which is periodically broadcasted causes constant inter-symbol interference (ISI). In the wireless communication system employing the OFDMA, when subchannels including all subcarriers or a plurality of subcarriers of one base station are set to high power according to a high modulation class, the other base station cannot make a communication through all the subcarriers or subchannels due to the inter-symbol interference.

When the frame timing of one base station is deviated due to a disorder or defect after the frame synchronization has been completed between neighboring base stations, the electric waves from the base station may cause the inter-symbol interference in the other base station, similarly to the base stations apart by a large distance.

SUMMARY OF THE INVENTION

The present invention has been made in view of the above circumstances. Accordingly, an aspect of the present invention is to provide a wireless communication system, a base station, a management server, and a wireless communication method, which can avoid inter-symbol interference so as to improve performance of a base station by adjusting frame timing or transmission power, even when a base station is apart by a distance or more which is assumed by a guard interval, or when a base station has abnormal frame timing.

According to an exemplary embodiment of the present invention, there is provided a wireless communication system comprising: a plurality of base stations configured to set up a wireless communication with a mobile station; and a management server which manages the plurality of base stations. Each of the base stations comprises: a carrier sensing unit which performs carrier sensing for one or more other base stations; a list generating unit which generates a monitor list by listing a difference in frame timing between the base station and each of the one or more other base stations for which the carrier sensing is performed; and a base station transmitter which transmits the monitor list to the management server. The management server comprises: a management receiver which receives the monitor lists from the plurality of base stations; a calculation unit which calculates a shift amount by which the frame timing of a target base station is to be shifted, based on the monitor lists, and calculates differences in frame timing among the plurality of base stations when the calculated shift amount is reflected to the target base station; and a shift instructing unit which instructs to shift the frame timing of the target base station by the calculated shift amount if the differences in frame timing among the plurality of base stations when reflecting the calculated shift amount is improved from those before reflecting the calculated shift amount.

According to another exemplary embodiment of the present invention, there is provided a base station configured to set up a wireless communication with a mobile station and connected to a management server, the base station comprising: a carrier sensing unit which performs carrier sensing for one or more other base stations; a list generating unit which generates a monitor list by listing a difference in frame timing from the one or more other base stations for which the carrier sensing is performed; a base station transmitter which transmits the monitor list to the management server; and a shifting unit which shifts the frame timing of the base station by a shift amount calculated by the management server based on the monitor list.

According to another exemplary embodiment of the present invention, there is provided a management server which manages a plurality of base stations configured to set up a wireless communication with a mobile station. The management server comprises: a management receiver which receives monitor lists in which differences in frame timing among the plurality of base stations are listed; a calculation unit which calculates a shift amount by which a frame timing of a target base station is to be shifted, based on the monitor lists, and calculates differences in frame timing among the plurality of base stations when the calculated shift amount is reflected in the target base station; and a shift instructing unit which instructs to shift the frame timing of the target base station by the calculated shift amount if the differences in frame timing among the plurality of base stations when reflecting the calculated shift amount is improved from those before reflecting the calculated shift amount.

According to another exemplary embodiment of the present invention, there is provided a wireless communication method of adjusting a frame timing in a plurality of base stations configured to set up a wireless communication with a mobile station by using a management server which manages the plurality of base stations. The method comprises: by each of the base stations, performing carrier sensing for one or more other base stations; generating a monitor list by listing differences in frame timing between the base station and the one or more different base stations for which the carrier sensing is performed, and transmitting the monitor list to the management server, and by the management server, receiving the monitor lists from the plurality of base stations; calculating a shift amount by which the frame timing of a target base station is to be shifted, based on the received monitor lists, and calculating differences in frame timing among the plurality of base stations when the calculated shift amount is reflected to the target base station; and instructing to shift the frame timing of the target base station by the calculated shift amount if the differences in frame timing among the plurality of base stations when reflecting the calculated shift amount is improved from those before reflecting the calculated shift amount.

According to the above-described configuration, even when a base station is apart by a distance or more which is assumed by the guard interval or a base station has abnormal frame timing, it may be possible to avoid the inter-symbol interference and to improve the performance of the base station by adjusting the frame timing or the transmission power of the base station.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF THE INVENTION

Hereinafter, exemplary embodiments of the present invention will be described in detail with reference to the accompanying drawings. Sizes, materials, and other specific numerical values in the exemplary embodiments are only examples for easily understanding the present invention, and do not limit the present invention unless otherwise specified. In the specification and the drawings, components having a substantially identical function and configuration are denoted by the same reference numeral, and duplicated description will be omitted. Components which are not directly related to the present invention are not shown in the figures.

(Wireless Communication System 100)

Figure 1:
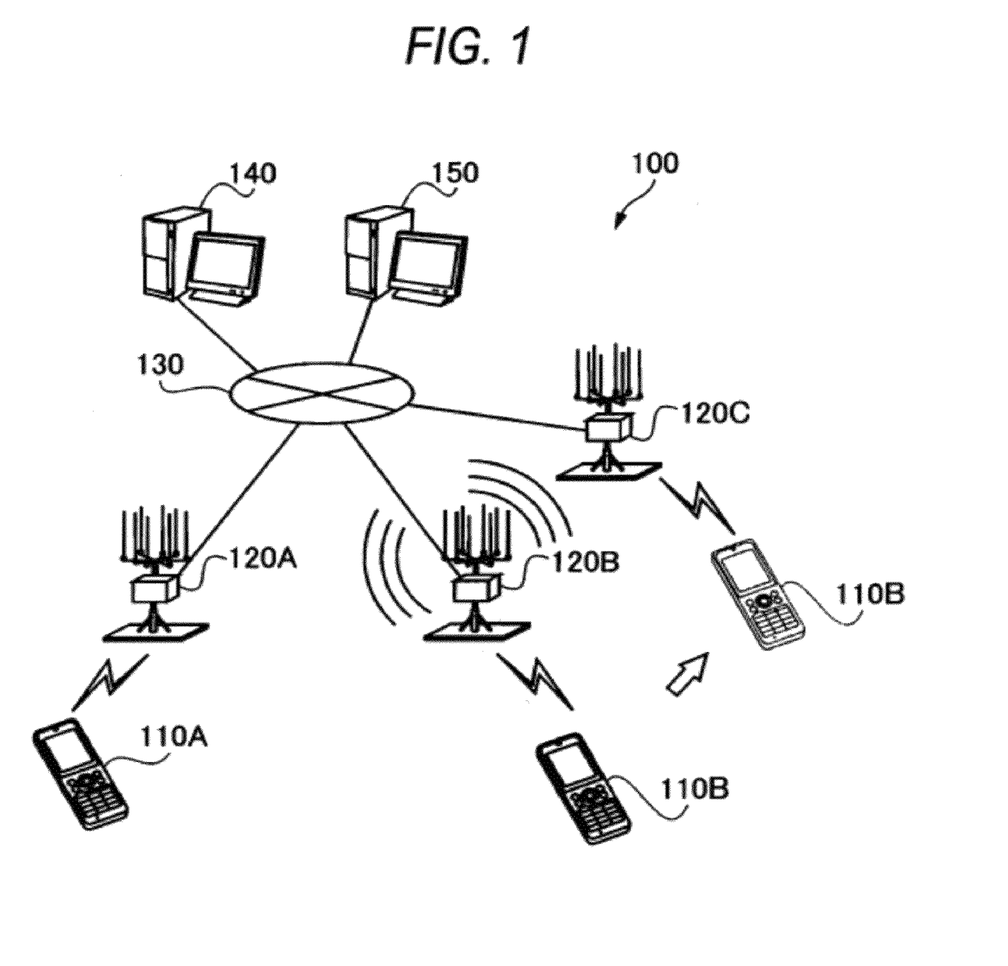
FIG. 1 is a diagram schematically illustrating connection relationships in a wireless communication system.

FIG. 1 is a diagram schematically illustrating connection relationships in a wireless communication system 100. The wireless communication system 100 includes mobile stations 110 (110A and 110B), base stations 120 (120A, 120B, and 120C), a communication network 130 including an Integrated Services Digital Network (ISDN), the Internet, or a dedicated network, a relay server 140, and a management server (BMS: Base station Management Server) 150.

In the wireless communication system 100, when a user sets up a communication link to a different mobile station 110B with the user's mobile station 100A, the mobile station 100A requests a base station 120A in a communicable range for a wireless connection. The base station 120A receives the wireless connection request and requests the relay server 140 for a communication connection with a communication destination through the communication network 130. The relay server 140 selects a base station 120B in a wireless communicable range of the mobile station 110B with reference to location registration information of the mobile station 110B, secures a communication path between the base station 120A and the base station 120B, and sets up a communication between the mobile station 110A and the mobile station 110B.

Here, as the mobile station 110B which is the communication destination moves, a distance between the mobile station 110B and the base station 120B increases, and thus the wireless communication with the base station 120B becomes disabled. The mobile station 1110B predicts that the wireless communication would be disabled due to a decrease in received field strength of a signal from the base station 120B, performs carrier sensing, and requests the base station 120B for a wireless communication with a base station 120C having high received field strength. When the base station 120B delivers the request to the relay server 140, the relay server 140 performs a handover from the base station 120B to the base station 120C.

The base stations 120 are necessary to synchronize the frame timing therein with other base stations in order to set up a wireless communication with the mobile station 110 and in order to perform a handover between the base stations 120. For example, if the base station 120B in FIG. 1 is taken as a master base station, the neighboring base stations 120A and 120C receive a control signal shown by a wave pattern in the drawing from the base station 120B and set their frame timing according to the control signal thereby performing the frame synchronization.

However, for example, even when the frame synchronization between the base stations is normally carried out, if a distance between the base stations is large as in the relationship between the base stations 120A and 120C, the propagation delay may exceed the guard interval, thereby causing the inter-symbol interference. Similarly, the inter-symbol interference may occur in a base station of which the frame timing is deviated due to a disorder or defect after the frame synchronization has been completed.

In this exemplary embodiment, by intentionally further adjusting the original frame timing of the base station 120 having been subjected to the frame synchronization, it is possible to synthetically configure the valid frame timing in consideration of the neighboring base stations 120 and to avoid the constant inter-symbol interference, thereby improving the performance of the base stations 120. Specific configurations of the base station 120 and the management server 150 in the wireless communication system 100 according to this exemplary embodiment will be described below.

(Base Station 120)

Figure 2:
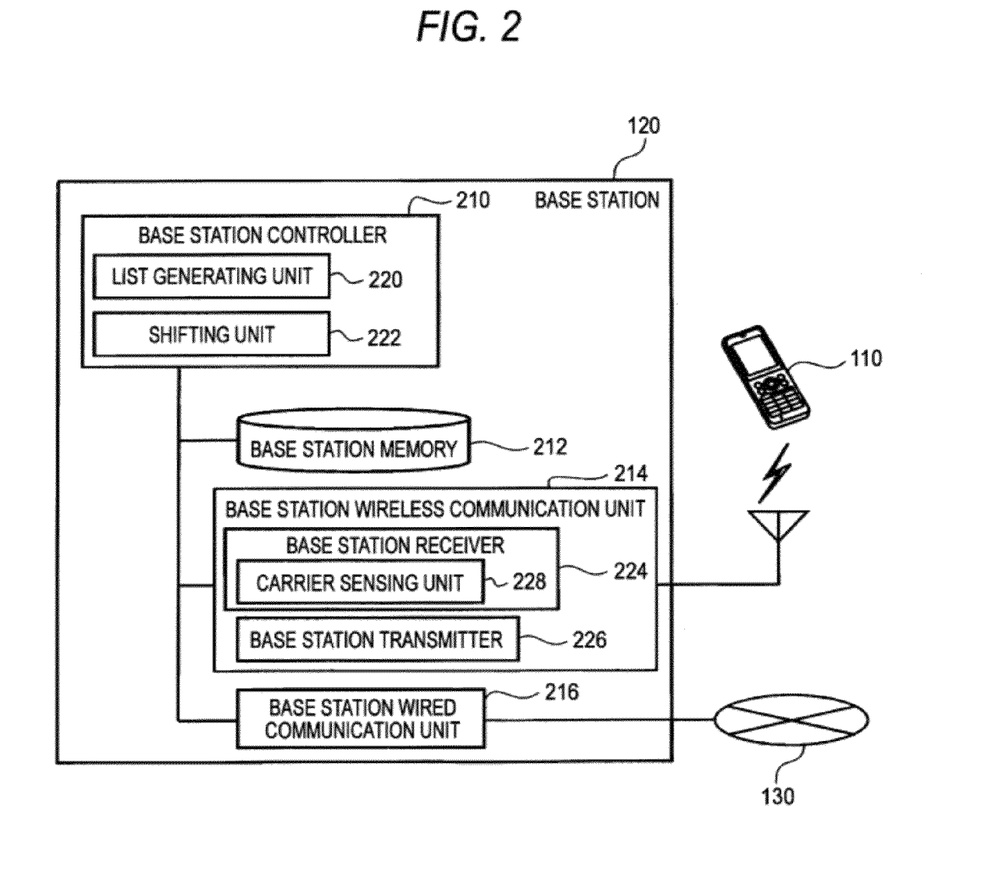
FIG. 2 is a block diagram schematically illustrating a configuration of a base station.

FIG. 2 is a block diagram schematically illustrating a configuration of the base station 120. The base station 120 includes a base station controller 210, a base station memory 212, a base station wireless communication unit 214, and a base station wired communication unit 216.

The base station controller 210 manages and controls the entire base station 120 by use of a semiconductor integrated circuit including a central processing unit (CPU). The base station controller 210 serves as a list generating unit 220 and a shifting unit 222. The list generating unit 220 lists differences in frame timing between a base station and one or more different base stations, for which carrier-sensing has been performed by a carrier sensing unit 228 to be described later and which exists in the neighborhood, and received field strengths, in order to generate a monitor list. The shifting unit 222 shifts the frame timing of the base station by a shift amount calculated by the management server 150 based on the monitor list.

The base station memory 212 includes a ROM, a RAM, an EEPROM, a nonvolatile RAM, a flash memory, and an HDD and stores programs or the like processed by the base station controller 210.

The base station wireless communication unit 214 sets up a wireless communication with the mobile station 110 using, for example, a TDMA/TDD scheme or an Orthogonal Frequency Division Multiplexing Access (OFDMA) scheme and adaptively changes a modulation method depending on the communication state with the mobile station 110 (adaptive modulation). The base station wireless communication unit 214 serves as a base station receiver 224 for receiving signals from the mobile station 110 and a base station transmitter 226 for transmitting signals to the mobile station 110. The base station receiver 224 includes a carrier sensing unit 228 which performs carrier sensing for one or more other base stations existing in the neighborhood therearound. The base station transmitter 226 transmits the monitor list generated by the list generating unit 220 to the management server 150.

The base station wired communication unit 216 is connected to various servers including the relay server 140 or the management server 150 through the communication network 130.

(Management Server 150)

Figure 3:
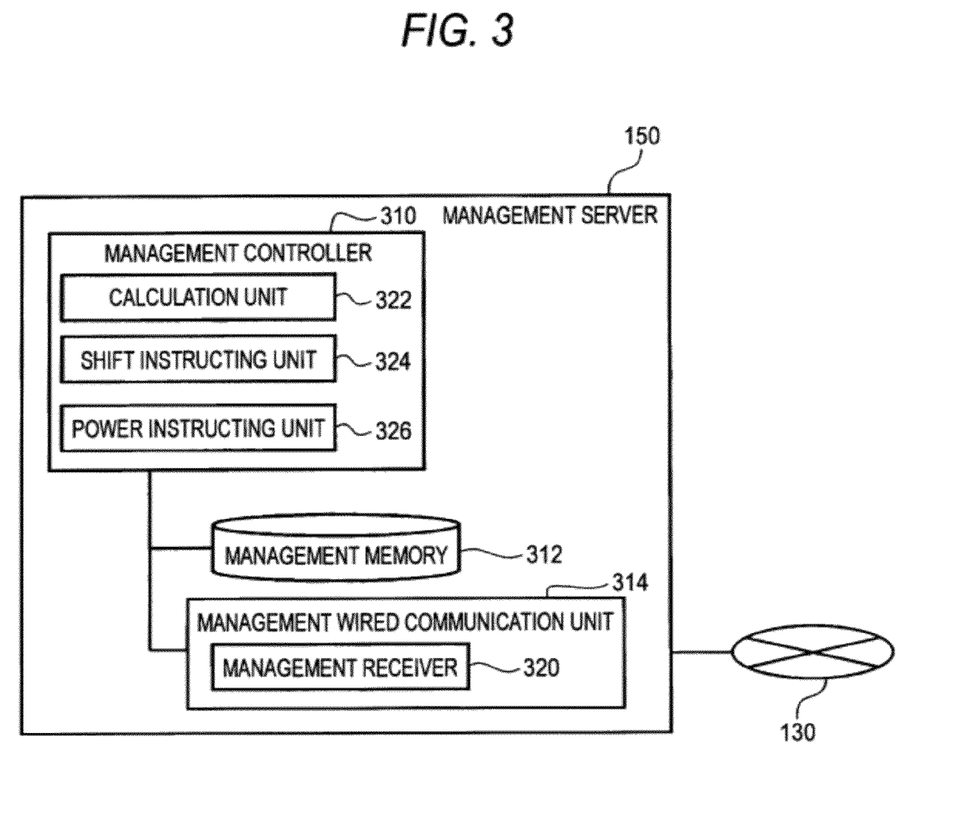
FIG. 3 is a block diagram schematically illustrating a configuration of a management server.

FIG. 3 is a block diagram schematically illustrating a configuration of the management server 150. The management server 150 manages the plurality of base stations 120 connected to the communication network 130 and includes a management controller 310, a management memory 312, and a management wired communication unit 314.

The management controller 310 manages and controls the entire management server 150 by use of a semiconductor integrated circuit including a central processing unit (CPU). The management memory 312 includes a ROM, a RAM, an EEPROM, a nonvolatile RAM, a flash memory, and an HDD and stores programs or the like processed by the management controller 310.

The management wired communication unit 314 is connected to the base stations 120 through the communication network 130. The management wired communication unit 314 serves as a management receiver 320 for receiving the monitor lists transmitted from the plurality of base stations 120.

The management controller 310 serves as a calculation unit 322, a shift instructing unit 324, and a power instructing unit 326.

The calculation unit 322 calculates a shift amount by which a frame timing of a target base station 120 of the plurality of base stations 120 is to be shifted based on the monitor lists received by the management receiver 320 and calculates the differences in frame timing among the plurality of base stations on the assumption that the calculated shift amount is reflected in the target base station 120. The sequence of calculating the shift amount from the monitor lists will be described later.

As described above, even when the frame timing of the base stations 120 is completely synchronized with the absolute time, if a distance between the base stations is large, the propagation delay due to the distance occurs. According to this exemplary embodiment, the differences in frame timing among the plurality of base stations are calculated and it is determined whether the differences would be improved by shifting the frame timing of a target base station 120. When it is found that the shifting is valid, the frame timing is shifted regardless of the original frame timing of the target base station 120. Herein, whether the differences are improved may be determined based on whether the differences are decreased. That is, if the differences become smaller, it may be determined that the differences are improved.

According to the above-described configuration, even when a base station 120 is apart by a distance or more which is assumed by the guard interval or a base station 120 has abnormal frame timing, it is possible to synthetically configure valid frame timing in consideration of the neighboring base stations 120 by shifting the frame timing of the base station 120, thereby avoiding the inter-symbol interference to improve the performance of the base station 120.

The calculation unit 322 may set a base station 120 as the target base station based on a variance of the differences in frame timing between each base station and other base stations. Particularly, the calculation unit 322 may set a base station 120 having a smallest variance of the differences in frame timing from one or more other base stations 120, as a target base station, the frame timing of which is to be shifted in calculating the shift amount.

It is noted that, for example, when a base station group of which the differences in frame timing becomes improved and a base station group of which the differences in frame timing becomes deteriorated exist by shifting the frame timing of a base station 120 to advance or delayed, the shifting of the frame timing may lack of validity. Therefore, by setting as the shift target a base station 120, which satisfies a predetermined condition that the shift direction is leaned on one side, that is, the variance of the differences in frame timing is the smallest, and the like, it is possible to improve the performance of the base station with the minimum process.

The calculation unit 322 may set the base station 120 having the absolute value of the shift amount greater than a predetermined value, as a target based station of which the frame timing is to be shifted.

The purpose of the calculation unit 322 is to compensate for the propagation delay which cannot be absorbed by the guard interval. Therefore, the shift amount in the range absorbable by the guard interval is not necessarily reflected. It is possible to improve the performance of the base station with the minimum process by setting the base station 120 having the absolute value of the shift amount which exceeds a predetermined value (exceeds the guard interval), as the shift target.

The calculation unit 322 may calculate the shift amount by weighting the differences in frame timing with the received field strength.

The inter-symbol interference due to the propagation delay depends on the differences in frame timing and the received field strengths. Therefore, when the difference in frame timing increases but the received field strengths are small, the other base station 120 is less influenced. According to this exemplary embodiment, it is possible to calculate the valid shift amount of the frame timing in consideration of the received field strength, by weighting the frame timing with the received field strength.

The shift instructing unit 324 shifts the frame timing of the target base station by the calculated shift amount if the differences in frame timing among the plurality of base stations when reflecting the calculated shift amount is improved from those before reflecting the calculated shift amount.

The power instructing unit 326 controls transmission powers of the base stations. The power instructing unit 326 reduces the transmission power of the target base station 120 when it is difficult to improve the differences in frame timing by shifting the frame timing by use of the shift instructing unit 324.

When the frame timing of a base station 120 is randomly shifted, the other base station 120 may be influenced. In this case, it is possible to reduce the inter-symbol interference with the other base station 120, by reducing the transmission power of one base station 120 without shifting the frame timing.

The shift instructing unit 324 may not shift the frame timing when the power from the target base station 120 received by the different base stations 120 is smaller than predetermined power.

This exemplary embodiment is on the premise that the frame timing is shifted, but it is not necessary to shift the frame timing when the power is so small not to cause the inter-symbol interference. According to this configuration, it is possible to reduce the unnecessary process of shifting the frame timing and to reduce the power or the cost.

(Wireless Communication Method)

A wireless communication method of adjusting the frame timing using the base station 120 and the management server 150 described above will be described below.

Figure 4:
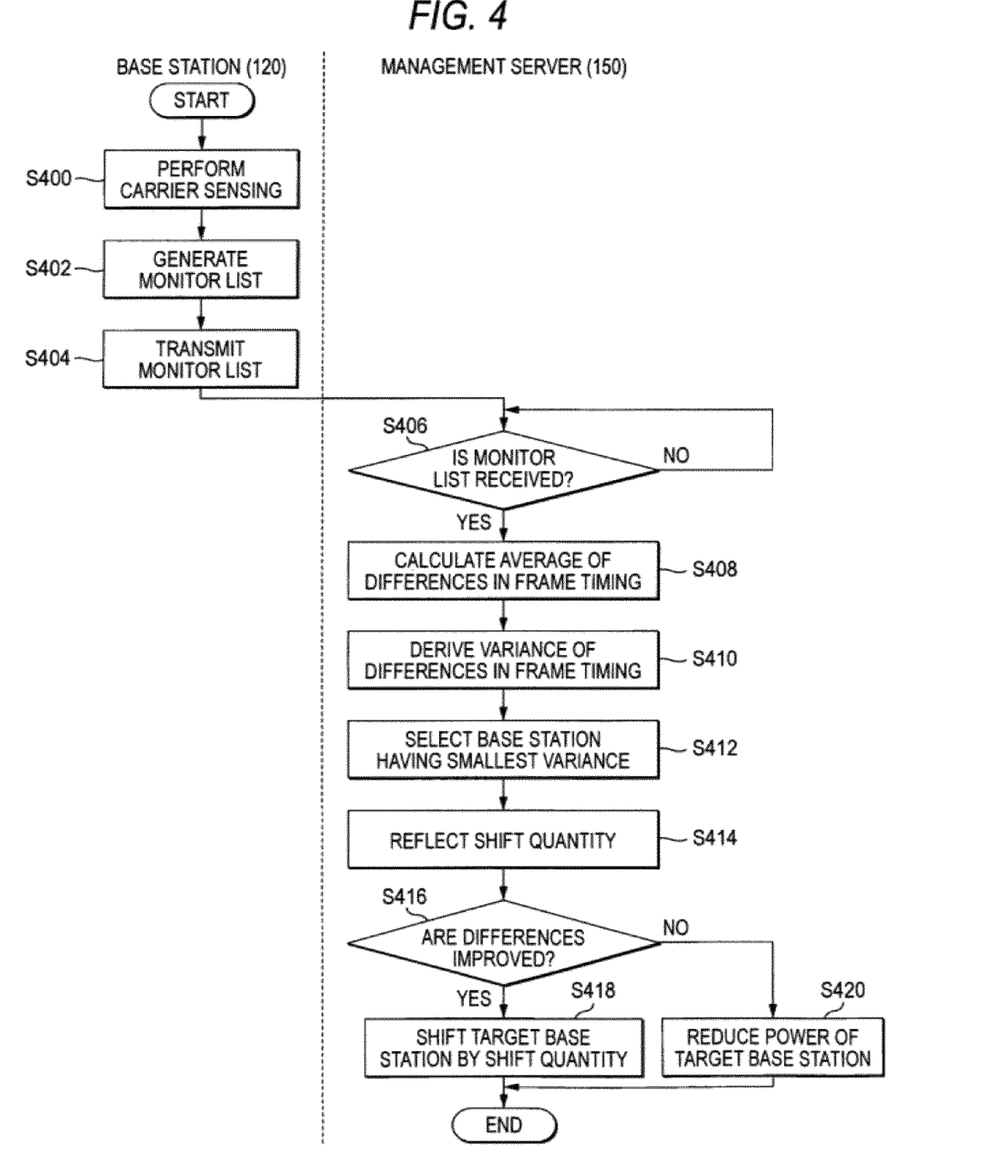
FIG. 4 is a flowchart illustrating specific processing operations of a wireless communication method.
Figure 5:
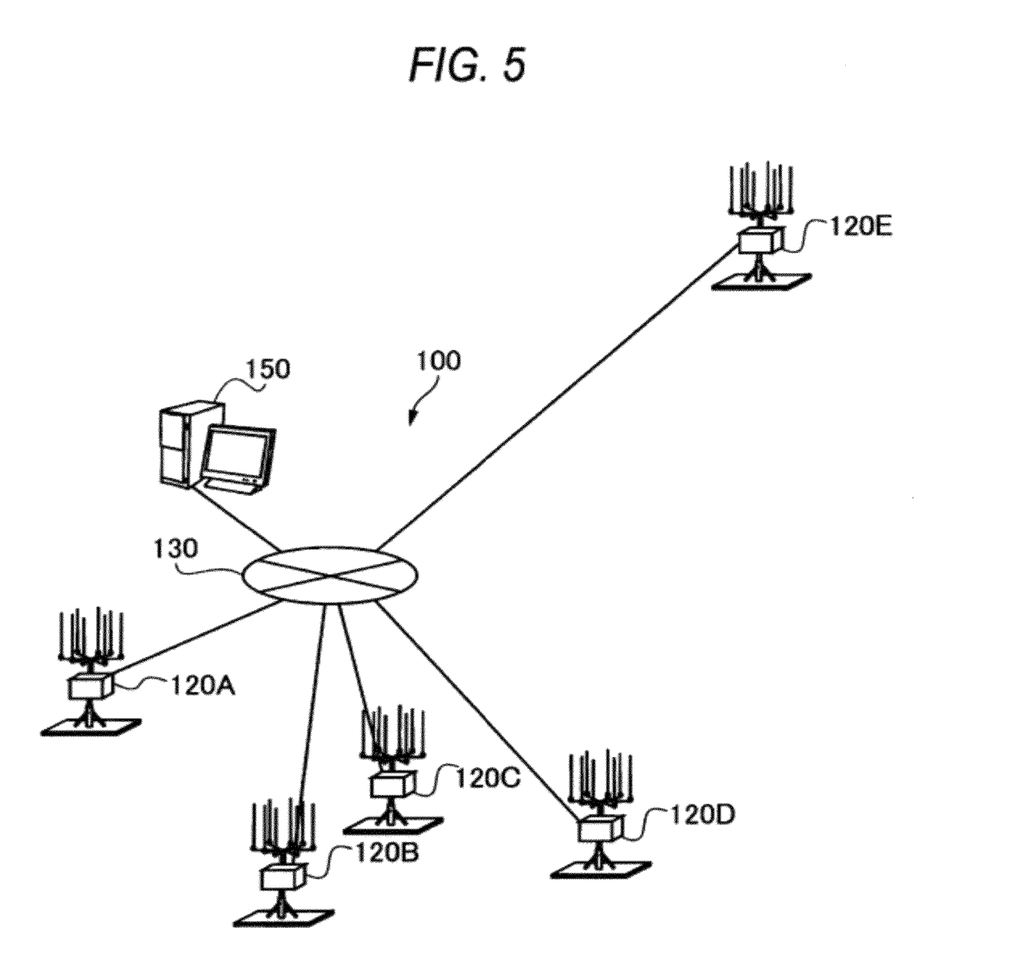
FIG. 5 is a diagram illustrating an arrangement example of a plurality of base stations and a management server to which the wireless communication method is applied.

FIG. 4 is a flowchart illustrating specific processing operations of the wireless communication method and FIG. 5 is a diagram illustrating an arrangement example of a plurality of base stations 120 and the management server 150 to which the wireless communication method is applied.

Each of the plurality of base stations 120A, 120B, 120C, 120D, and 120E perform carrier sensing for the other base stations 120 existing in the neighborhood (S400) and lists differences in frame timing between the base station and the other base stations for which the carrier sensing is performed to generate a monitor list (S402).

Figure 6A:
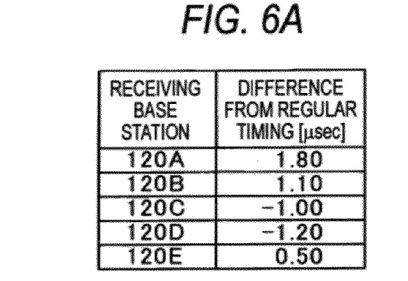
FIGS. 6A to 6C are diagrams illustrating monitor lists of base stations.
Figure 6B:
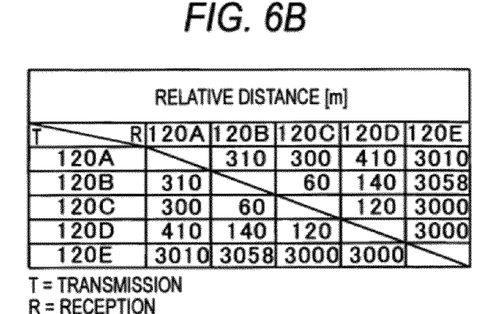
Figure 6C:
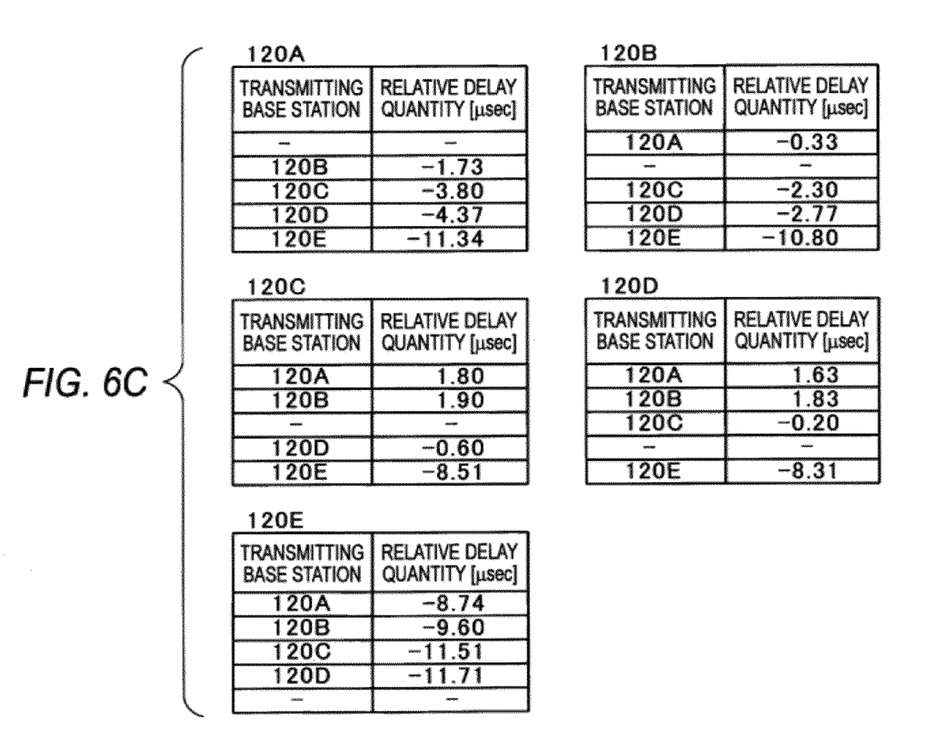

FIGS. 6A to 6C are diagrams illustrating the monitor lists generated in the base stations 120A, 120B, 120C, 120D, and 120E. The base stations 120A, 120B, 120C, 120D, and 120E already have time differences shown in FIG. 6A from the regular timing with respect to the absolute time and the base stations 120A, 120B, 120C, 120D, and 120E have relative distances shown in FIG. 6B. The relative delay amounts (differences in frame timing) in the base stations 120A, 120B, 120C, 120D, and 120E with respect to transmission signals from the other base stations are calculated based on the above-described conditions, as shown in FIG. 6C. The monitor list includes information including the differences in frame timing.

The base stations 120A, 120B, 120C, 120D, and 120E transmit the generated monitor lists to the management server, respectively (S404) and the management server 150 receives all the monitor lists from the base stations 120A, 120B, 120C, 120D, and 120E (S406).

Subsequently, the management server 150 calculates the shift amount by which the frame timing of the base stations 120A, 120B, 120C, 120D, and 120E are to be shifted, that is, the average of the differences in frame timing, based on the monitor lists from the base stations 120A, 120B, 120C, 120D, and 120E (S408), and calculates the variance of the differences in frame timing for each of the base stations (S410). Then, the management server 150 sets the base station having the smallest variance as a shift target (S412).

Figure 7A:
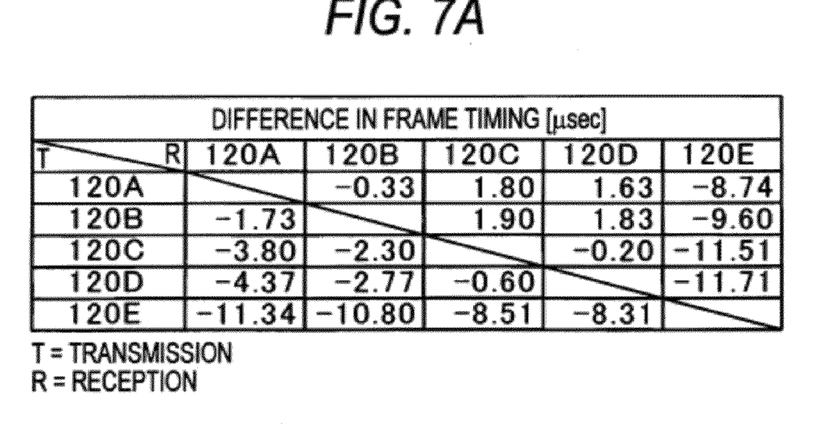
FIGS. 7A to 7D are diagrams for explaining monitor list processes in the base stations.
Figure 7B:
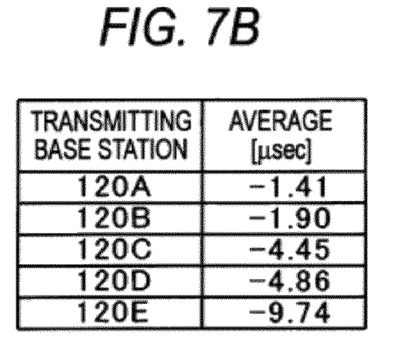

FIGS. 7A to 7D are diagrams illustrating the monitor list processing of the respective base stations 120A, 12013, 120C, 120D, and 120E. The calculation unit 322 of the management server 150 calculates all the differences in frame timing of the base stations 120A, 120B, 120C, 120D, and 120E as shown in FIG. 7A. Then, the average value (FIG. 7B) and the variance (FIG. 7C) are calculated for each of the base stations 120A, 120B, 120C, 120D, and 120E. The variance is calculated by using the expression $\sigma=\sqrt{(1/n\times\Sigma((/y-y_n)^2))}$ based on the square error $(/y-y_n)^2$ of the differences in frame timing.

Figure 7C:
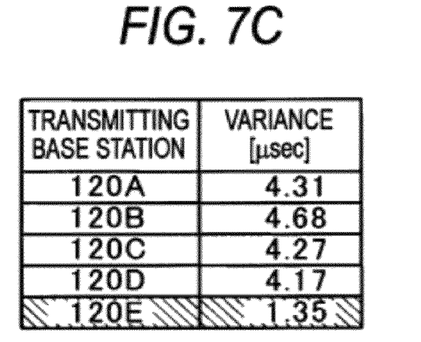

In this exemplary embodiment, the base station 120E having the smallest calculated variance is selected as a shift target. Since the absolute value 9.74 μsec of the average (shift amount) of the base station 120E is greater than a predetermined value of the shift amount, for example, 5 μsec, it is selected as the shift target of the base stations 120.

Figure 7D:
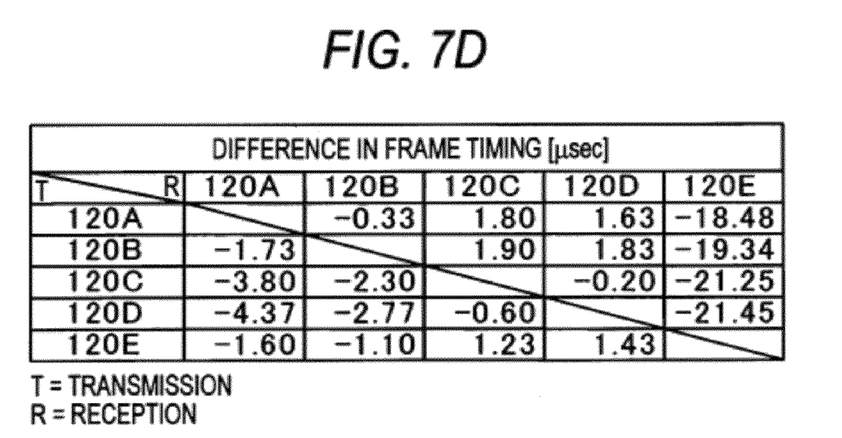

Subsequently, the differences in frame timing among the base stations are calculated on the assumption that the calculated shift amount is reflected in the base station 120E as the shift target (S414). Then, the differences in frame timing are corrected as shown in FIG. 7D. At this time, it is determined whether the differences in frame timing among the base stations when reflecting the calculated shift amount is improved from those before reflecting the calculated shift amount (S416). When it is predicted that the differences are improved, the frame timing of the target base station 120E is shifted by the calculated shift amount (S418). When it is determined that it is difficult to improve the differences by shifting the frame timing, the transmission power of the target base station 120E is reduced (S420).

FIGS. 5, 6, and 7 show an example where only the base station 120E is apart from the other base stations 120A, 120B, 120C, and 120D. The base station 120E may exist, for example, in a region where the service of the wireless communication system 100 is started or in a remote country place. In this exemplary embodiment, when the frame timing is deviated from the regular timing of the base stations 120 but does not influence the other base stations 120, the frame timing is adjusted to advance, for example, by 9.74 sec.

At this time, the differences in frame timing of the base stations 120A, 120B, 120C, and 120D other than the base station 120E are improved, but the absolute values of the differences in frame timing of the base station 120E increase. The power instructing unit 326 of the management server 150 reduces the transmission power of the base station which is considered as influencing the base station 120E among the base stations 120A, 120B, 120C, and 120D other than the base station 120E, for example, the base station 120C.

The wireless communication method can be applied to the base station having the frame timing deviated due to a disorder or defect after the frame synchronization is completed.

Figure 8A:
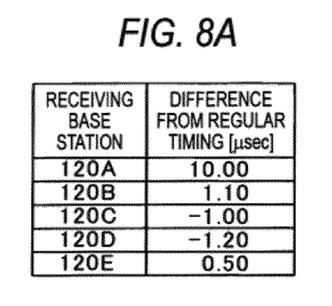
FIGS. 8A to 8C are diagrams illustrating monitor lists of the base stations in another example.
Figure 8B:
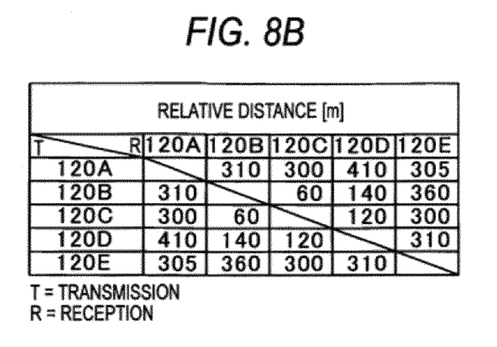
Figure 8C:
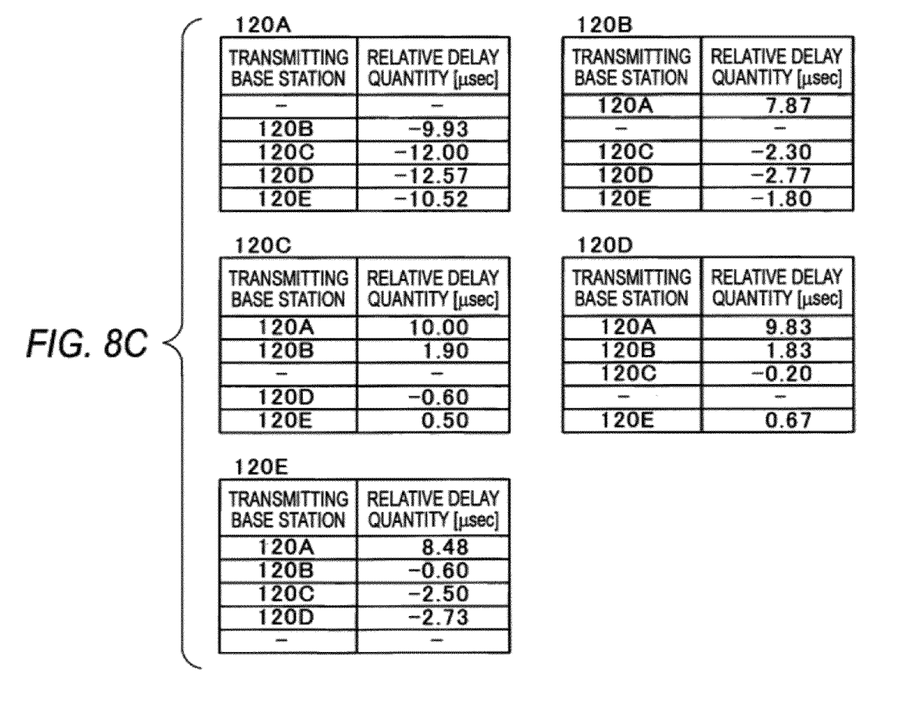

FIGS. 8A to 8C are diagrams illustrating the monitor lists of the base stations 120A, 120B, 120C, 120D, and 120E in another example, and FIGS. 9A to 9D are diagrams illustrating the monitor list processing of the base stations 120A, 120B, 120C, 120D, and 120E. For example, in the situation shown in FIGS. 8A and 813 in the arrangement example of the base stations 120 shown in FIG. 5 (however, the relative distances between the base station 120E and the other base stations 120A, 120B, 120C, and 120D are shorter than those in the above-described example), the relative delay amounts (differences in frame timing) in the base stations 120A, 120B, 120C, 120D, and 120E with respect to the transmission signals from the different base stations are calculated as shown in FIG. 8C.

Figure 9A:
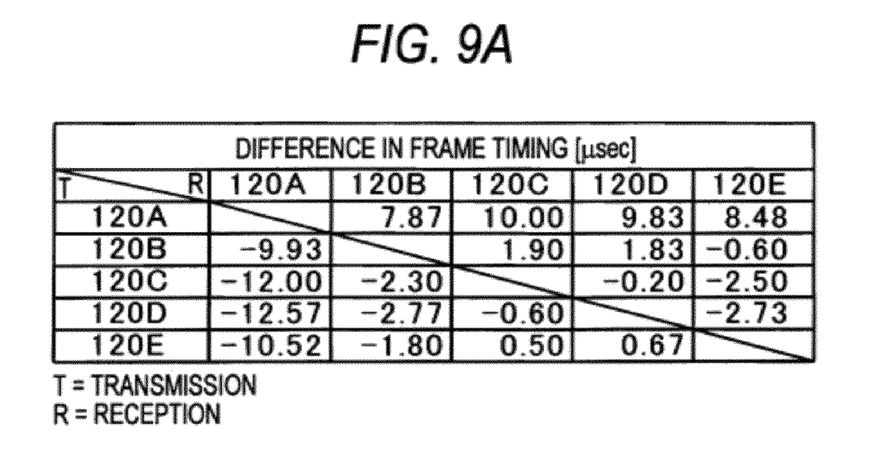
FIGS. 9A to 9D are diagrams for explaining monitor list processes in the base stations.
Figure 9B:
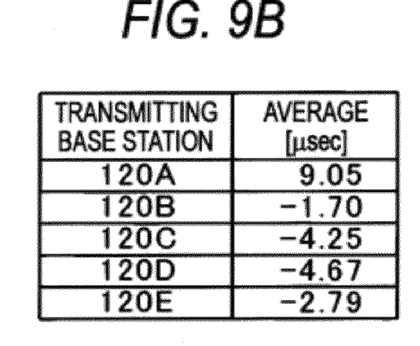
Figure 9C:
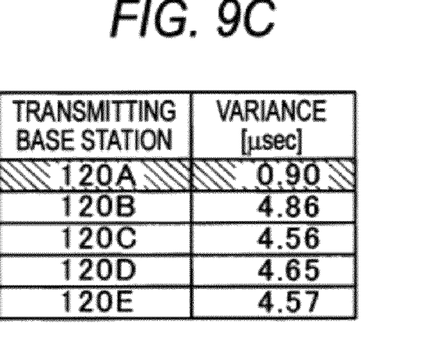

The calculation unit 322 of the management server 150 calculates all the differences in frame timing among the base stations 120A, 12013, 120C, 120D and 120E as shown in FIG. 9A and calculates the average (FIG. 9B) and the variance (FIG. 9C) for each of the base stations 120A, 120B, 120C, 120D, and 120E. Here, the base station 120A having the smallest calculated variance is selected as a shift target.

Figure 9D:
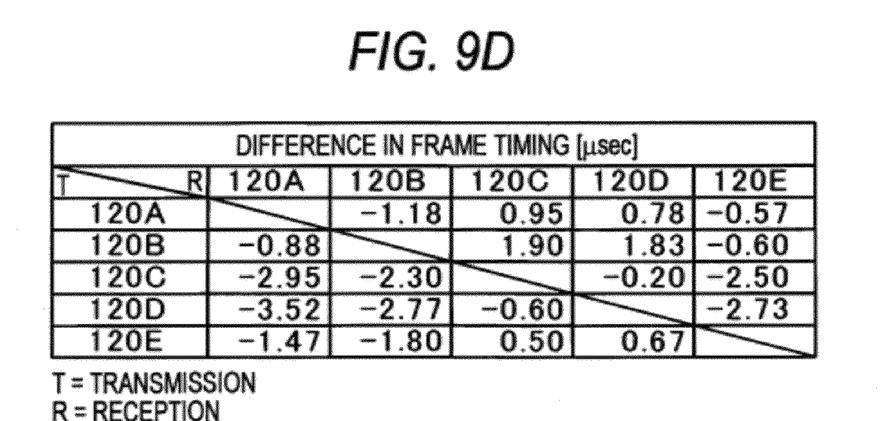

The calculation unit 322 calculates the differences in frame timing among the plurality of base stations on the assumption that the calculated shift amount 9.05 μsec is reflected in the target base station 120A. Then, as shown in FIG. 9D, since the differences in frame timing are corrected and the differences in frame timing among the plurality of base stations when reflecting the calculated shift amount are improved from those before reflecting the calculated shift amount, the frame timing of the target base station 120E is shifted by the calculated shift amount.

In the above-described wireless communication method, even when a base station 120 is apart by a distance or more which is assumed by the guard interval or a base station 120 has abnormal frame timing, it is possible to avoid the inter-symbol interference and to improve the performance of the base station 120 by adjusting the frame timing or the transmission power.

While the present invention has been shown and described with reference to certain exemplary embodiments thereof, it will be understood by those skilled in the art that various changes in form and details may be made therein without departing from the spirit and scope of the invention as defined by the appended claims.

The processes of the wireless communication method described herein is not necessarily performed in time series in the sequence described in the flowchart and may include parallel processes or sub routines.

The present invention can be applied to a wireless communication system for adjusting the frame timing of base stations, a base station, a management server, and a wireless communication.

What is claimed is:

1. A wireless communication system comprising:
a plurality of base stations configured to set up a wireless communication with a mobile station; and
a management server which manages the plurality of base stations,
wherein each of the base stations comprises:
a carrier sensing unit which performs carrier sensing for one or more other base stations;
a list generating unit which generates a monitor list by listing a difference in frame timing between the base station and each of the one or more other base stations for which the carrier sensing is performed; and
a base station transmitter which transmits the monitor list to the management server, and
wherein the management server comprises:
a management receiver which receives the monitor lists from the plurality of base stations;
a calculation unit which calculates a shift amount by which the frame timing of a target base station is to be shifted, based on the monitor lists, and calculates differences in frame timing among the plurality of base stations when the calculated shift amount is reflected to the target base station; and a shift instructing unit which instructs to shift the frame timing of the target base station by the calculated shift amount if the differences in frame timing among the plurality of base stations when reflecting the calculated shift amount is improved from those before reflecting the calculated shift amount.

2. The wireless communication system according to claim 1,
wherein the calculation unit sets a base station as the target base station based on a variance of the differences in frame timing between each base station and the one or more other base stations.

3. The wireless communication system according to claim 2,
wherein the calculation unit sets as the target base station the base station having the smallest variance of the differences in frame timing from the one or more other base stations.

4. The wireless communication system according to claim 1,
wherein the calculation unit calculates the shift amount so as to be corresponding to an average of the differences in frame timing between the target base station and the one or more other base stations.

5. The wireless communication system according to claim 1,
wherein the calculation unit sets the base station having an absolute value of the calculated shift amount greater than a predetermined value, as the target base station of which the frame timing is to be shifted.

6. The wireless communication system according to claim 1,
wherein the list generating unit further lists received field strengths, and wherein the calculation unit calculates the shift amount by weighting the differences in frame timing with the received field strengths.

7. The wireless communication system according to claim 1,
wherein the management server further includes a power instructing unit which reduces transmission power of a base station.

8. The wireless communication system according to claim 1,
wherein the shift instructing unit does not shift the frame timing when a power received by the one or more other base stations from the target base station is smaller than a predetermined power.

9. A management server which manages a plurality of base stations configured to set up a wireless communication with a mobile station, the management server comprising:
a management receiver which receives monitor lists in which differences in frame timing among the plurality of base stations are listed;
a calculation unit which calculates a shift amount by which a frame timing of a target base station is to be shifted, based on the monitor lists, and calculates differences in frame timing among the plurality of base stations when the calculated shift amount is reflected in the target base station; and
a shift instructing unit which instructs to shift the frame timing of the target base station by the calculated shift amount if the differences in frame timing among the plurality of base stations when reflecting the calculated shift amount is improved from those before reflecting the calculated shift amount.

10. A wireless communication method of adjusting a frame timing in a plurality of base stations configured to set up a wireless communication with a mobile station by using a management server which manages the plurality of base stations, the method comprising:
by each of the base stations,
performing carrier sensing for one or more other base stations;
generating a monitor list by listing differences in frame timing between the base station and the one or more other base stations for which the carrier sensing is performed, and
transmitting the monitor list to the management server, and
by the management server,
receiving the monitor lists from the plurality of base stations;
calculating a shift amount by which the frame timing of a target base station is to be shifted, based on the received monitor lists, and calculating differences in frame timing among the plurality of base stations when the calculated shift amount is reflected to the target base station; and
instructing to shift the frame timing of the target base station by the calculated shift amount if the differences in frame timing among the plurality of base stations when reflecting the calculated shift amount is improved from those before reflecting the calculated shift amount.

11. The method according to claim 10, further comprising setting the target base station based on a variance of the differences in frame timing between each base station and the other base stations of the plurality of base stations.

12. The method according to claim 11,
wherein setting the target base station further comprises setting the target base station to be the base station having the smallest variance of the differences in frame timing.

13. The method according to claim 10,
wherein calculating the shift amount further comprises calculating an average of the differences in frame timing between the target base station and the one or more other base stations.

14. The method according to claim 10, further comprising setting the target base station to be the base station having an absolute value of the calculated shift amount greater than a predetermined value.

15. The method according to claim 10,
wherein generating the monitor lists further comprises listing received field strengths, and
wherein calculating the shift amount further comprises weighting the differences in frame timing with the received field strengths.

16. The method according to claim 10, further comprising reducing transmission power of a base station.

17. The method according to claim 10,
wherein instructing to shift the frame timing of the target base station further comprises determining if a power received by the one or more other base stations is smaller than a predetermined power and not instructing to shift the frame timing if the power is smaller than the predetermined power.

* * * * *